Figure 1:
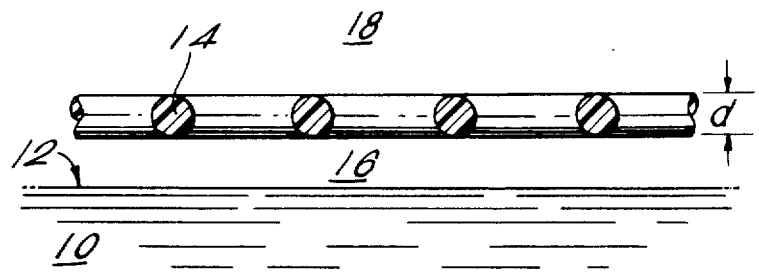

United States Patent
Bourne et al.

[11] 3,797,998
[45] Mar. 19, 1974

[54] METHOD FOR AFFECTING A CONDITION OF A BOUNDARY LAYER OF GAS OR VAPOUR AT A SURFACE OF A BODY OF LIQUID

[76] Inventors: Hector Roland Bourne, 8 Wellesley Rd., Hawthorn; Bruce Cameron Brown, 84 Marianne Way, Victoria, both of Australia

[22] Filed: July 7, 1971

[21] Appl. No.: 160,482

[30] Foreign Application Priority Data
July 7, 1970   Australia.............................. 1751/70

[52] U.S. Cl............................. 21/60.5 R, 21/60.5 A
[51] Int. Cl.................................................. B01j 1/18
[58] Field of Search..................... 21/60.5 R, 60.5 A

[56] References Cited
UNITED STATES PATENTS
3,127,235   3/1964   Benzel............................... 21/60.5 R
3,147,067   9/1964   Salyer............................... 21/60.5 R

*Primary Examiner*—Morris O. Wolk
*Assistant Examiner*—Arnold Turk
*Attorney, Agent, or Firm*—Cushman, Darby & Cushman

[57] ABSTRACT

A method of reducing evaporation from a water storage by use of a meshwork such as a plastics net which may be laid over the water or on the surface thereof. In the preferred method, the net is laid on the surface and a barrier layer of an oily or other film-forming liquid is located in the meshes.

8 Claims, 3 Drawing Figures

PATENTED MAR 19 1974  3,797,998

METHOD FOR AFFECTING A CONDITION OF A BOUNDARY LAYER OF GAS OR VAPOUR AT A SURFACE OF A BODY OF LIQUID

The present invention relates to a method for affecting a condition of a boundary layer of gas or vapour at a surface of a body of liquid. It is intended particularly, but not exclusively, for controlling evaporation from the exposed surface of a water storage.

In the past, a number of methods have been developed to control evaporation of water from water storages. These have ranged from the simple expedient of providing a fixed cover constructed of a conventional material, such as corrugated iron, to the spreading of a surface membrane, such as a polyethylene film, or the spreading of a surface layer of an oily material, such as cetyl alcohol. Fixed covers have proved expensive and very difficult to construct over a large area. On the other hand, the use of a floating layer of film or oil involves significant cost as well as difficulty in maintaining continuity of the layer over the water surface. Where continuity is maintained, oxygen may be excluded by reason of some film properties and this permits growth of organisms which cause decay and contamination. This can render the water unsuitable for human or animal consumption without additional costly treatment.

According to the present invention there is provided a method for affecting a condition of a boundary layer of gas or vapour at a surface of a body of liquid comprising laying a meshwork across said surface.

According to an aspect of the invention there is provided a method of reducing evaporation from a surface of a body of liquid to an adjacent body of gas or vapour comprising laying a meshwork across the surface. This aspect of the invention may include the step of providing a barrier layer of a second liquid on the surface.

The invention includes apparatus for use in said methods comprising a meshwork and means to locate the meshwork in a position in which it is laid across the surface.

Preferably the meshwork is made of a material which is durable, resistant to chemical action, particularly corrosion, and light in weight. The material may be plastics.

The invention can be used to reduce fluid velocity in the boundary layer along the surface. In this case the meshwork may be caused to project from the surface into the boundary layer to be affected, or may be located in spaced relation to the surface with the boundary layer to be affected, or part of it, sandwiched between the meshwork and the surface. The same possible dispositions of the meshwork can be used to affect thermal radiation impinging on the surface from the side thereof on which the meshwork projects or on which it is located. The invention can also be used to affect wave conditions at the surface by retarding wave development. In this case the meshwork would lie in, or in contact with the surface.

All these effects can be used to reduce evaporation from a water surface. The reduction in boundary fluid velocity retards the removal of water vapour from the surface, both by simple control of the moist air layer and by reducing the tendency to produce waves which would increase surface area and therefore the potential for evaporation. Waves can also be damped directly by contact with the meshwork. Reduction of impinging thermal radiation of course reduces heat available to produce evaporation. It will be noted that all these effects can be gained while permitting access of air to the water surface.

The reduction of fluid velocity effect can also be used to reduce movement or spread of a layer of a first liquid on a surface of a second liquid where the layer of the first liquid is likely to be subjected to wind effects in an adjoining boundary layer of a gas or vapour, the meshwork being located so as to reduce fluid velocity in that boundary layer. In this case, the meshwork is preferably caused to penetrate both the liquid layer and the boundary layer so that at least part of the liquid layer is physically restrained by the meshwork. Preferably too the meshwork is arranged to penetrate the body of the second liquid. By this means, the invention may be used to reduce movement or spread of a barrier layer of oily liquid on a water surface where the barrier layer is subjected to atmospheric winds. As is known the barrier layer itself may be used to reduce evaporation from the water surface.

By way of example, two methods of controlling evaporation from a water storage by use of a plastics net alone will now be described with reference to the diagrams in FIGS. 1 and 2 respectively.

FIG. 1 illustrates a body of water 10 with a surface 12 exposed to the air. To reduce evaporation from the water surface, a net, the strands of which are indicated at 14, is located so as to be spaced a short distance above surface 12. The net may be carried by suitable floats or, if the area of the exposed surface is not large, the net may be spread over the surface and supported at its edges.

The net reflects a certain amount of solar radiation thereby reducing the heat available at surface 12 for causing evaporation. In addition the net tends to isolate the boundary layer 16 of air between itself and the water surface from the air 18 above the net. The effect of this is to reduce the velocity of air flow in the layer 16, and therefore to reduce evaporation by lessening removal of water saturated vapour from above the water surface and by reducing the tendency of air flow to produce wave action.

Figure 2:
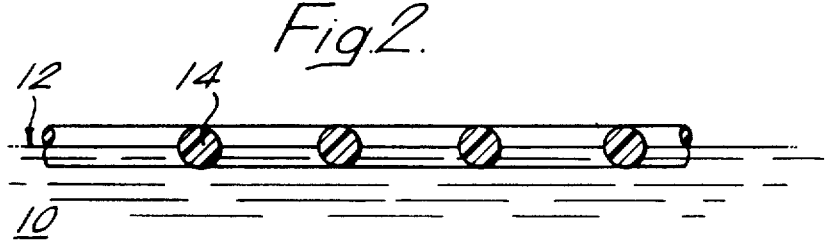

FIG. 2 illustrates an alternative arrangement for obtaining the same effects. In this case, instead of the net being located above the water, it is permitted to float in the water so as to project from surface 12 into the air. In this case, there is still a certain amount of reflection of solar radiation, and the projection of the net above the surface still tends to reduce air velocity in the layer adjacent the interface. It will be noted that in the methods of FIGS. 1 and 2, air is given adequate access to the water surface for purposes of oxygenation.

Experiments have been performed in relation to reduction of water evaporation by the methods described with reference to FIGS. 1 and 2. In each experiment, standard 44 gallon drums were used as the water storage medium and the meshwork comprised a plastics net of homogeneous polyethylene, each mesh being of a generally square configuration with a strand depth ("$d$" FIG. 1) of 0.05 inches. In some experiments the net was simply floated on the water surface, while in others it was suspended above the water surface by means of carrier floats. The results listed in Table 1 are expressed as percentage water saved relative to losses encountered with an unprotected water surface.

TABLE 1

| Size of Mesh (inches) | Colour of Net | Net on or above Water Surface | Percentage Saving |
| --- | --- | --- | --- |
| ¼ × ¼ | White | on | 12–20 |
| ¼ × ¼ | do. | above | 19–29 |
| 1/16 × 1/16 | do. | do. | 31–48 |
| ¼ × ¼ | Black | do. | 11–17 |

Figure 3:
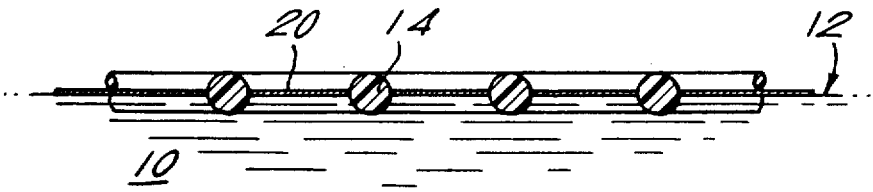

By way of further example, FIG. 3 illustrates a method of controlling evaporation by means of a net and a barrier layer of cetyl alcohol. The arrangement is generally similar to that of FIG. 2, but layer 20 of cetyl alcohol covers the water surface. In this case evaporation is considerably reduced because of the protection of the water surface by the alcohol layer. The net reduces air flow velocity at the alcohol/air interface thereby reducing the tendency for wind to strip the alcohol layer from the water surface. Further, it will be noted that the alcohol lies in the meshes and is physically restrained from movement relative to the water surface. An alcohol/air interface can also be at least partially protected from wind effects by location of the net above but near the interface as was described with reference to FIG. 1.

In one experiment to test the effectiveness of the arrangement illustrated in FIG. 3 in reducing water evaporation, the net, water storage medium and measurement method were similar to those used in the experiments described above. For comparison purposes, a test under the same conditions was made with a barrier layer of cetyl alcohol alone. The results are listed in Table 2.

TABLE 2

| | | Percentage Saving | |
| --- | --- | --- | --- |
| Size of Mesh (inches) | Colour of Net | Alcohol & Net | Alcohol Alone |
| ¼ × ¼ | White | 44–60 | 35–40 |

A further experiment with a net/barrier layer combination was carried out using a 24′ × 24′ square tank as the water storage medium. The net in this case was made of white foamed polyethylene, the foamed material having the advantage of greater buoyancy than the homogeneous material. The mesh size was 1″ × 1″ and, the barrier layer was again cetyl alcohol. The same measurement procedure was adopted, but in this case measurements were made over a period as indicated in Table 3.

TABLE 3

| Age in days | Reduction in Evaporation % |
| --- | --- |
| 3 | 58 |
| 15 | 62 |
| 22 | 41 |
| 28 | 22 |

This data indicates that the net/alcohol combination has a useful life of approximately 3 to 4 weeks, which is a substantial advance in relation to the useful life of systems employing a barrier layer alone. The deterioration of the combination was due to gradual removal of the cetyl alcohol, which can of course be periodically replaced to give continued effective protection to the water surface.

The invention is not limited to details of the particular methods described above. Meshworks having strands of expanded materials may also be used. Suitable plastics materials are polyethylene, polystyrene, polyvinyl chloride and nylon materials. Other plastics materials may however be found suitable and the colour of the material may also be varied. The mesh size and configuration may be adjusted as desired or found suitable. As indicated above, the meshwork may be carried on floats or may be supported from the sides of the liquid storage to be protected. The barrier layer may be of alternative oily or film-forming materials. The invention may be used to control conditions adjacent other than air/water interfaces e.g., in storage of hydrocarbons or in ore flotation or separation process. These and many other modifications and variations fall within the scope of the invention as defined by the appended claims.

We claim:

1. A method of reducing evaporation from a surface of a body of liquid having a boundary layer of gas or vapour at the surface comprising laying a net across said surface, so that the net projects from the surface into the boundary layer, or is located in spaced relation to the surface with at least a part of the boundary layer sandwiched between the net and the surface.

2. A method as in claim 1 wherein the horizontal dimension of the meshes of the net are greater than the thickness of the material of the net and wherein the net is located in spaced relation to the surface of the body of the liquid with at least a part of the boundary layer sandwiched between the net and the surface.

3. A method as claimed in claim 1, wherein the horizontal dimension of meshes of the net is from 1/16 to 1 inch.

4. A method according to claim 3 and further including the step of providing a barrier layer of a second liquid on the surface of the body of liquid.

5. A method as claimed in claim 4, wherein the net is so located that the barrier layer lies in the meshes of the net.

6. A method as claimed in claim 4, wherein the barrier layer comprises cetyl alcohol.

7. Apparatus for reducing evaporation from a surface of a body of liquid having a boundary layer of a gas or vapour at the surface comprising a net and means to locate the net in a position in which it is laid across the surface, so that the net projects from the surface into the boundary layer, or is located in spaced relation to the surface with at least a part of the boundary layer sandwiched between the net and the surface.

8. Apparatus as claimed in claim 7, wherein the net is made of a foamed plastics material.

* * * * *

UNITED STATES PATENT OFFICE
CERTIFICATE OF CORRECTION

Patent No. 3,797,998        Dated March 19, 1974

Inventor(s) Hector R. BOURNE; Bruce C. BROWN

It is certified that error appears in the above-identified patent and that said Letters Patent are hereby corrected as shown below:

After paragraph "[76]" on the front page format, insert:

--[73] Assignee: Nylex Corporation Limited
Richmond, Victoria, Australia--

Signed and sealed this 1st day of July 1975.

(SEAL)
Attest:

RUTH C. MASON
Attesting Officer

C. MARSHALL DANN
Commissioner of Patents
and Trademarks